UNITED STATES PATENT OFFICE.

GUSTAF W. MAGNUS, OF SEATTLE, WASHINGTON.

LIQUID WATERPROOF SURFACING COMPOSITION.

1,079,782.      Specification of Letters Patent.      Patented Nov. 25, 1913.

No Drawing.      Application filed July 19, 1911. Serial No. 639,447.

*To all whom it may concern:*

Be it known that I, GUSTAF W. MAGNUS, a citizen of the United States, residing at Seattle, in the county of King and State of Washington, have invented certain new and useful Improvements in Liquid Waterproof Surfacing Compositions, of which the following is a specification.

This invention relates to a waterproofing compound for coating fabrics; and has for its object the provision of a liquid compound of this character to be used as a dressing for rendering the fabric or other material impervious to moisture, pliable, and with a surface not liable to crack or peel off and having a fresh, glossy appearance.

With these objects in view, the invention consists in a composition formed of the following ingredients and proportions, compounded and used in the manner hereinafter explained. I take fifteen parts by weight of raw linseed oil and one part of low grade rubber, and boil the same together slowly for four hours, stirring constantly. The mixture is then removed from the fire and approximately one part of white drier, or equivalent, is added and thoroughly incorporated. After cooling the mixture may be applied to the fabric to be treated with a brush. The white drier employed is made by boiling sugar of lead in raw linseed oil and thinning with turpentine or benzin.

The fabric is provided with a coating upon both sides and allowed to dry for about twenty-four hours whereupon another coat may be added usually upon the outside only. It will not injure the most delicate fabric and will render the same perfectly watertight for an indefinite period.

It is particularly adapted to the preparation of water-proof clothing, its pliability and lack of susceptibility to heat or cold causing it to be well fitted for personal wear.

It is inexpensive in cost of materials and manufacture. The grade of rubber used may vary with the quality of product sought but the cheaper grades, as recovered rubber, such as is obtained from old rubber boots and the like, is sufficient for the purpose.

The composition may be made in any color desired by the use of correspondingly tinted rubber or the use of rubber of a neutral color and the addition of a suitable pigment.

What I claim as my invention, is—

A liquid water-proof surfacing composition consisting of fifteen parts by weight of raw linseed oil, one part by weight of low grade rubber and one part suitable white drier.

GUSTAF W. MAGNUS.

Witnesses:
   HENRY WEHRMANN,
   H. BARNES.

Copies of this patent may be obtained for five cents each, by addressing the "Commissioner of Patents, Washington, D. C."